United States Patent
Imagawa et al.

(10) Patent No.: US 12,522,956 B2
(45) Date of Patent: Jan. 13, 2026

(54) BUNDLED YARN, HYDRAULIC COMPOSITION AND MOLDED BODY

(71) Applicant: KURARAY CO., LTD., Kurashiki (JP)

(72) Inventors: Akira Imagawa, Okayama (JP);
Takafumi Horikoshi, Okayama (JP);
Hisashi Suemori, Okayama (JP);
Yoshihiro Iwasaki, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 382 days.

(21) Appl. No.: 17/418,586

(22) PCT Filed: Dec. 6, 2019

(86) PCT No.: PCT/JP2019/047952
§ 371 (c)(1),
(2) Date: Jun. 25, 2021

(87) PCT Pub. No.: WO2020/137466
PCT Pub. Date: Jul. 2, 2020

(65) Prior Publication Data
US 2022/0064824 A1   Mar. 3, 2022

(30) Foreign Application Priority Data

Dec. 27, 2018  (JP) ................. 2018-244838

(51) Int. Cl.
*D02G 3/04* (2006.01)
*C04B 7/02* (2006.01)
*C04B 16/06* (2006.01)

(52) U.S. Cl.
CPC ............ *D02G 3/045* (2013.01); *C04B 7/02* (2013.01); *C04B 16/0641* (2013.01); *C04B 16/065* (2013.01); *C04B 2235/5212* (2013.01); *C04B 2235/5268* (2013.01); *D10B 2321/06* (2013.01); *D10B 2321/08* (2013.01)

(58) Field of Classification Search
CPC .......... C04B 20/1033; C04B 16/0641; D06M 2200/40; D06M 15/333; D10B 2321/06
See application file for complete search history.

(56) References Cited

U.S. PATENT DOCUMENTS

| | | | | |
|---|---|---|---|---|
| 5,420,180 A * | 5/1995 | Katayama | ............ | D06M 15/11 524/53 |
| 5,612,412 A * | 3/1997 | Watanabe | ............ | C08L 101/00 525/62 |
| 6,387,991 B1 | 5/2002 | Hayes | | |
| 2009/0149599 A1 * | 6/2009 | Shibutani | ............ | C09D 129/04 525/56 |
| 2016/0251466 A1 * | 9/2016 | Kato | ............ | B41M 5/5254 428/32.39 |

FOREIGN PATENT DOCUMENTS

| | | | |
|---|---|---|---|
| JP | 49-36797 A | | 4/1974 |
| JP | 56-125269 A | | 10/1981 |
| JP | 64-1424 A | | 1/1989 |
| JP | 4-74736 A | | 3/1992 |
| JP | 8-127971 A | | 5/1996 |
| JP | 8-325947 A | | 12/1996 |
| JP | 9-278503 A | | 10/1997 |
| JP | 10-183473 A | | 7/1998 |
| JP | 2001-354454 A | | 12/2001 |
| JP | 2016180188 A | * | 10/2016 |
| WO | WO-2018225717 A1 | * | 12/2018 ............. C08F 16/06 |

OTHER PUBLICATIONS

Espacenet translation of JP-2016180188-A. (Year: 2016).*
Wikimedia Foundation. (Aug. 19, 2023). Polyvinyl alcohol. Wikipedia. https://en.wikipedia.org/wiki/Polyvinyl_alcohol (Year: 2023).*
Fiber measurement conversions. MiniFibers, Inc. (n.d.). https://www.minifibers.com/our-company/about-fibers/fiber-measurement-conversions/ (Year: 2023).*
J-Plat translation of JPH10183473A. (Year: 1998).*
Espacenet translation of WO-2018225717-A1 (Year: 2018).*
Extended European Search Report issued Aug. 30, 2022 in European Patent Application No. 19902602.2, 9 pages.
International Search Report issued Jan. 28, 2020 in PCT/JP2019/047952 (submitting English translation only), 3 pages.
International Preliminary Report on Patentability and Written Opinion of the International Searching Authority issued Jun. 16, 2021 in PCT/JP2019/047952 (submitting English translation only), 8 pages.

* cited by examiner

*Primary Examiner* — Marla D McConnell
*Assistant Examiner* — Christine X Nisula
(74) *Attorney, Agent, or Firm* — Oblon, McClelland, Maier & Neustadt, L.L.P.

(57) ABSTRACT

The present invention relates to a bundled yarn, comprising plural fibers integrated by a sizing agent, wherein the sizing agent is a modified polyvinyl alcohol comprising a structural unit (X) derived from an unsaturated carboxylic acid or derivative thereof in an amount of 0.1 to 10% by mole, taking the amount of all monomer units as 100% by mole, which modified polyvinyl alcohol has a saponification degree of 85% by mole or higher.

20 Claims, No Drawings

BUNDLED YARN, HYDRAULIC COMPOSITION AND MOLDED BODY

CROSS-REFERENCE TO RELATED APPLICATIONS

The present application is the national stage of international application PCT/JP2019/047952, filed on Dec. 6, 2019, and claims the benefit of the filing date of Japanese Appl. No. 2018-244838, filed on Dec. 27, 2018.

TECHNICAL FIELD

The present invention relates to a bundled yarn, a hydraulic composition, and a molded body.

BACKGROUND ART

Conventionally, in a molded body that is a cured product of a hydraulic material typified by concrete and cement mortar, it is known to incorporate reinforcing fibers into a matrix containing the hydraulic material for the purposes of, for example, improving the mechanical strength, such as flexural strength and toughness, and inhibiting cracking. However, it is extremely difficult to uniformly disperse such fibers in the matrix, and there are cases where the fibers are entangled to form agglomerates (fiber balls) during kneading of the fibers with the hydraulic material. When such agglomerates are formed, a reinforcing effect attributed to the fibers is unlikely to be exerted.

As a means for solving the above-described problem, for example, Patent Document 1 discloses a bundled yarn hardened with a water-soluble sizing agent, which bundled yarn has a separation degree of fibers of 20% or higher in a concrete molded article. Further, Patent Document 2 discloses a bundled yarn which is bundled with a water-soluble polymeric resin and has a separation degree of 50% or higher at pH 12.

PRIOR ART DOCUMENTS

Patent Documents

[Patent Document 1] Japanese Patent Publication (Kokoku) No. S64-1424
[Patent Document 2] Japanese Laid-Open Patent Publication No. H10-183473

SUMMARY OF THE INVENTION

Problems to be Solved by the Invention

In Patent Document 1, a water-soluble polymer that is soluble in water and has a film-forming capability is used as the water-soluble sizing agent. However, when fibers are bundled using a water-soluble polymer having high film-forming capability, it is difficult to increase the separation degree of fibers, and the strength of a molded body cannot be sufficiently improved. In addition, when the duration of kneading the bundled yarn with a hydraulic material and water is extended for increasing the separation degree of fibers, although the separation degree of fibers is increased by applying a shear force, fibers are likely to be damaged and the formation of fiber balls is thus likely to occur. As a result, the strength of the resulting molded body is reduced.

Patent Document 2 focuses on the separation degree of fibers under an alkaline condition of pH 12; however, a certain kneading time is required to bring the pH of the matrix to 12 or higher and, consequently, this makes separated-fibers more likely to form fiber balls, and the strength of a molded body cannot be sufficiently improved.

In view of the above, an object of the present invention is to provide a bundled yarn which has a high separation degree of fibers and a low agglomeration degree of separated-fibers when kneaded with a hydraulic material such as a cement.

Means for Solving Problems

The present inventors conducted detailed studies to solve the above-described problems, thereby completing the present invention. That is, the present invention encompasses the following preferred modes.

[1] A bundled yarn, comprising plural fibers integrated by a sizing agent,
wherein the sizing agent is a modified polyvinyl alcohol comprising a structural unit (X) derived from an unsaturated carboxylic acid or derivative thereof in an amount of 0.1 to 10% by mole, taking the amount of all monomer units as 100% by mole, which modified polyvinyl alcohol has a saponification degree of 85% by mole or higher.

[2] The bundled yarn according to [1], wherein the modified polyvinyl alcohol has a viscosity-average polymerization degree of 100 to 5,000.

[3] The bundled yarn according to [1] or [2], wherein the saponification degree of the modified polyvinyl alcohol is 88 to 100% by mole.

[4] The bundled yarn according to any one of [1] to [3], wherein the unsaturated carboxylic acid or derivative thereof is at least one selected from the group consisting of (meth)acrylic acids, (meth)acrylic acid alkyl esters, and (meth)acrylic acid metal salts.

[5] The bundled yarn according to any one of [1] to [4], wherein the modified polyvinyl alcohol comprises, as the structural unit (X), a structural unit represented by Formula (X1):

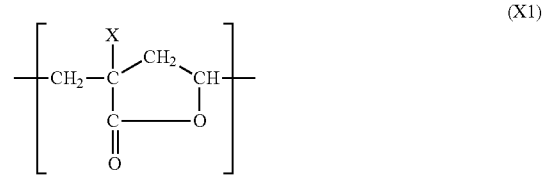

[wherein, X represents a hydrogen atom or a methyl group],
and/or a structural unit represented by Formula (X2):

[wherein, X represents a hydrogen atom or a methyl group, and Y represents a hydrogen atom, an alkali metal atom, or an alkyl group having 1 to 5 carbon atoms].

[6] The bundled yarn according to [5], wherein a molar amount ratio (X1/(X1+X2)) of the structural unit represented by Formula (X1) with respect to a total molar amount of the structural unit represented by Formula (X1) and the structural unit represented by Formula (X2) in the modified polyvinyl alcohol is 0.65 to 1.0.

[7] The bundled yarn according to any one of [1] to [6], wherein the fibers are polyvinyl alcohol fibers.

[8] The bundled yarn according to any one of [1] to [7], wherein the fibers have an average fiber diameter of 3 to 900 µm.

[9] The bundled yarn according to any one of [1] to [8], wherein the fibers have an aspect ratio of 50 to 2,500.

[10] The bundled yarn according to any one of [1] to [9], having a fiber agglomeration degree of 10% or lower.

[11] A hydraulic composition, comprising, at least: the bundled yarn according to any one of [1] to [10]; a cement component; an aggregate; and water.

[12] A molded body, obtained by curing the hydraulic composition according to [11].

Effects of the Invention

The bundled yarn of the present invention has a high fiber-separation degree of fibers and a low agglomeration degree of separated-fibers when kneaded with a hydraulic material such as a cement.

MODE FOR CARRYING OUT THE INVENTION

The bundled yarn of the present invention is a bundled yarn comprising plural fibers integrated by a sizing agent. The sizing agent is a modified polyvinyl alcohol comprising a structural unit (X) derived from an unsaturated carboxylic acid or derivative thereof in an amount of 0.1 to 10% by mole, taking the amount of all monomer units as 100% by mole, which modified polyvinyl alcohol has a saponification degree of 85% by mole or higher. By integrating fibers using the above-described specific sizing agent, the fibers can be quickly separated when the bundled yarn is kneaded in a hydraulic composition containing a hydraulic material such as a cement, so that not only the separation degree of the fibers can be increased but also the agglomeration degree of separated fibers can be reduced.

<Bundled Yarn>

The bundled yarn of the present invention comprises plural fibers and the above-described specific sizing agent, and the plural fibers are integrated by the sizing agent. The expression "plural fibers are integrated by a sizing agent" means that the plural fibers are in a bundled state, being adhered with one another by the sizing agent.

(Sizing Agent)

The sizing agent contained in the bundled yarn of the present invention is a modified polyvinyl alcohol, and this modified polyvinyl alcohol comprises a structural unit (X) derived from an unsaturated carboxylic acid or derivative thereof in an amount of 0.1 to 10% by mole, taking the amount of all monomer units of the modified polyvinyl alcohol as 100% by mole, and has a saponification degree of 85% by mole or higher. In the present invention, the term "modified polyvinyl alcohol" means a polyvinyl alcohol modified with the structural unit (X) derived from an unsaturated carboxylic acid or derivative thereof, and the modified polyvinyl alcohol has at least a structural unit derived from a vinyl ester monomer and the structural unit (X) derived from an unsaturated carboxylic acid or derivative thereof. The modified polyvinyl alcohol may also contain a structural unit other than the above-described ones, as long as the effects of the present invention are not impaired.

When the amount of all monomer units of the modified polyvinyl alcohol is taken as 100% by mole, the amount of the structural unit (X) derived from an unsaturated carboxylic acid or derivative thereof is 0.1 to 10% by mole. The bundled yarn is usually used by being dispersed in a hydraulic composition that contains at least a hydraulic material and water, and a molded body can be obtained by curing this hydraulic composition. It is believed that, by dispersing the fibers contained in the bundled yarn as uniform as possible in the matrix of the hydraulic composition without damaging the fibers in a single-fiber state, the effect of reinforcing the hydraulic material by the fibers can be improved. The hydraulic composition is produced by, for example, mixing the bundled yarn and the hydraulic material in a dry state in advance, and slowly adding water to the resulting mixture with stirring. The sizing agent is dissolved by the addition of water, and a shear force is generated by the stirring, whereby the bundled fibers are disentangled and separated. From the standpoint of improving the mechanical strength of a molded body by uniformly dispersing the fibers contained in the bundled yarn into the matrix of the hydraulic composition without damaging the fibers in a single-fiber state, it is believed to be extremely important that the sizing agent be rapidly dissolved in water and the fibers be quickly and sufficiently fiber-separated.

When the amount of the structural unit (X) is less than 0.1% by mole, since the solubility of the sizing agent in water is excessively low, the fibers are unlikely to be dispersed as single fibers in a matrix of a hydraulic material and water. In addition, it is necessary to separate the fibers by a shear force at the time of kneading the bundled yarn with the hydraulic material and water; therefore, the fibers themselves are likely to be bent to generate buckle parts. When buckle parts are generated in the fibers, fiber balls are likely to be formed as the fibers having the buckle parts act as nuclei. As a result thereof, the mechanical strength of the resulting molded body cannot be sufficiently improved.

When the amount of the structural unit (X) is greater than 10% by mole, since the solubility of the sizing agent in water is excessively high, the sizing agent is easily swollen by the moisture in the air, making the performance of the modified polyvinyl alcohol as a sizing agent (particularly the adhesion of the fibers) insufficient. Therefore, it is believed that the fibers are more likely to be damaged during dry-mixing of the bundled yarn with a hydraulic material such as a cement prior to the production of a hydraulic composition. When the fibers are damaged, bent parts also referred to as "buckle parts" are generated in the fibers, making fiber balls more likely to be formed using the fibers having the buckle parts as nuclei. As a result, a sufficient mechanical strength cannot be attained in a molded body.

From the standpoint of increasing the fiber separation degree and reducing the fiber agglomeration degree to improve the effect of reinforcing a molded body by the fibers, the amount of the structural unit (X) is preferably 0.5 to 10% by mole, more preferably 1 to 9.5% by mole, particularly preferably 2 to 9% by mole. The amount of the structural unit (X) that is contained in the modified polyvinyl alcohol and derived from an unsaturated carboxylic acid or derivative thereof can be determined from a peak in $^1$H-NMR of the modified polyvinyl alcohol, or from the ratio of monomers added in the production of the modified polyvinyl alcohol.

The saponification degree of the modified polyvinyl alcohol is 85% by mole or higher. When the saponification degree is lower than 85% by mole, since the modified polyvinyl alcohol does not have a sufficient solubility in water, quick and sufficient separation of the fibers cannot be attained. In addition, a high shear force and a long kneading time are required for separation of the fibers, as a result of which, even if the fiber-separation degree can be increased, the fibers are more likely to be damaged and the formation of fiber balls is more likely to occur. Consequently, a sufficient effect of reinforcing the resulting molded body cannot be obtained. From the standpoint of achieving quick separation of the fibers, increasing the fiber-separation degree of the fibers, reducing the fiber agglomeration degree, and consequently improving the effect of reinforcing a molded body by the fibers, the saponification degree of the modified polyvinyl alcohol is preferably 88% by mole or higher, more preferably 90% by mole or higher, still more preferably 95% by mole or higher, particularly preferably 98% by mole or higher. An upper limit of the saponification degree may be any value as long as it is 100% by mole or lower and, from the standpoint of improving the solubility of the modified polyvinyl alcohol in water through a reduction in the crystallization degree, the saponification degree is preferably 99.9% by mole or lower, more preferably 99.8% by mole or lower. The saponification degree can be determined by the method prescribed in JIS K6726(1994).

The viscosity-average polymerization degree of the modified polyvinyl alcohol is preferably 100 to 5,000, more preferably 100 to 4,000, still more preferably 300 to 3,500. When the viscosity-average polymerization degree is not lower than the above-described lower limit, the fiber bundling performance of the sizing agent is likely to be improved. Further, when the viscosity-average polymerization degree is not higher than the above-described upper limit, the solubility of the modified polyvinyl alcohol in water can be improved, so that quick and sufficient separation of the fibers is likely to be attained. The viscosity-average polymerization degree can be determined by the method prescribed in JIS K6726(1994). Specifically, when the saponification degree is lower than 99.5% by mole, the viscosity-average polymerization degree (P) can be calculated by the following equation using the intrinsic viscosity [η] (L/g) that is measured in water at 30° C. for a PVA saponified to a saponification degree of 99.5% by mole or higher.

$$P=([\eta]\times 10^4/8.29)^{(1/0.62)}$$

Examples of the unsaturated carboxylic acid that gives the structural unit (X) contained in the modified polyvinyl alcohol include ethylenically unsaturated carboxylic acids, such as acrylic acid, methacrylic acid, phthalic acid, maleic acid, and itaconic acid. Examples of their derivatives include alkyl esters and metal salts of the above-exemplified ethylenically unsaturated carboxylic acids. The modified polyvinyl alcohol used as the sizing agent may have a single kind or two or more kinds of structural units as the structural unit (X) derived from an unsaturated carboxylic acid or derivative thereof, and may have other structural unit as well.

From the standpoint of increasing the fiber-separation degree of the fibers and reducing the agglomeration degree of separated-fibers when using the bundled yarn by kneading it with a hydraulic material, the unsaturated carboxylic acid or derivative thereof is preferably at least one selected from the group consisting of (meth)acrylic acids, (meth)acrylic acid alkyl esters, and (meth)acrylic acid metal salts. It is noted here that the term "(meth)acryl" used herein means "acryl and/or methacryl".

Examples of the (meth)acrylic acid alkyl esters include esters formed by a (meth)acrylic acid and a linear or branched alcohol having 1 to 5 carbon atoms, specifically methyl (meth)acrylate, ethyl (meth)acrylate, propyl (meth) acrylate, butyl (meth)acrylate, and pentyl (meth)acrylate. Examples of the (meth)acrylic acid metal salts include alkali metal salts of (meth)acrylic acids. Examples of alkali metal elements thereof include lithium, sodium, and potassium.

The modified polyvinyl alcohol used as the sizing agent in the bundled yarn of the present invention usually has at least plural structural units derived from a vinyl ester monomer and plural structural units (X) derived from an unsaturated carboxylic acid or derivative thereof, which are monomers, and the amount of the structural units (X) derived from an unsaturated carboxylic acid or derivative thereof is 0.1 to 10% by mole, taking the amount of all monomer units as 100% by mole. Taking into consideration this molar ratio, a majority of the structural units (X) derived from an unsaturated carboxylic acid or derivative thereof that are contained in the modified polyvinyl alcohol are believed to exist adjacent to the structural units derived from a vinyl ester monomer. In this case, the structural units (X) and the structural units derived from a vinyl ester monomer may exist as separate structural units (monomer units); however, at least some of the plural structural units (X) may form ring-closed structural units with hydroxy groups contained in their adjacent structural units derived from a vinyl ester monomer.

It is noted here that a ring-closed structural unit formed by, for example, a carboxyl group contained in the structural unit (X) derived from an unsaturated carboxylic acid or derivative thereof and a hydroxy group contained in a structural unit derived from a vinyl alcohol is also a structural unit that contains the structural unit (X) and is thus a structural unit derived from an unsaturated carboxylic acid or derivative thereof. In the present specification, for the calculation of the amount of all monomer units of the modified polyvinyl alcohol, a ring-closed structural unit is not regarded as a single structural unit, but rather the pre-ring-opening structural unit (X) and a structural unit derived from a vinyl alcohol, which are structural units each corresponding to a monomer, are regarded as separate monomer units.

In one preferred mode of the present invention, the modified polyvinyl alcohol contained in the sizing agent has the structural unit (X) derived from an unsaturated carboxylic acid or derivative thereof, and/or a structural unit in which the structural unit (X) is ring-closed with its adjacent structural unit derived from a vinyl ester monomer. When a polyvinyl alcohol is modified with the structural unit (X) derived from an unsaturated carboxylic acid or derivative thereof, the resulting modified polyvinyl alcohol has excellent performance as a sizing agent, particularly in terms of fiber bundling performance, in a state of not being dissolved in water. Therefore, damage to the fibers during dry-mixing of the bundled yarn with a hydraulic material is likely to be inhibited. Since the polyvinyl alcohol modified with the structural unit (X) is highly soluble in water because of its carboxyl group and the like, the bundled yarn containing such a modified polyvinyl alcohol as a sizing agent is characterized in that the sizing agent is rapidly dissolved when the bundled yarn is mixed with water, and that quick and sufficient separation of the fibers is thereby attained. With regard to the quickness of fiber-separation, the desired quickness may vary depending on, for example, the amount of the bundled yarn to be used and the intended use of the hydraulic material and, in Examples of the present specification, the fiber-separation performance was evaluated when kneading was performed in a very short period of, for example, about several tens of seconds.

Particularly, when the modified polyvinyl alcohol has the structural unit (X) derived from an unsaturated carboxylic acid or derivative thereof, and/or a structural unit in which the structural unit (X) is ring-closed with its adjacent structural unit derived from a vinyl ester monomer, the modified polyvinyl alcohol in a ring-closed state has an extremely low solubility in water and thus exhibits excellent performance as a sizing agent, so that damage to the fibers during dry-mixing is likely to be inhibited. Such a ring-closed structure shows a high ring-opening property particularly when dissolved in water under an alkaline environment, and the modified polyvinyl alcohol having a ring-opened structural unit (X) is highly soluble in water. Therefore, the bundled yarn containing such a modified polyvinyl alcohol as a sizing agent is characterized in that the sizing agent is rapidly dissolved when the bundled yarn is mixed with water, and that quick and sufficient separation of the fibers is likely to be achieved.

In one preferred embodiment of the present invention, from the standpoint of increasing the fiber-separation degree of the bundled yarn and inhibiting fiber agglomeration, the modified polyvinyl alcohol contains, as the structural unit (X) derived from an unsaturated carboxylic acid or derivative thereof, a structural unit represented by Formula (X1):

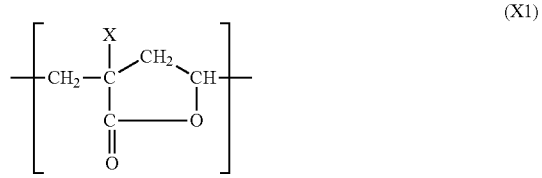

[wherein, X represents a hydrogen atom or a methyl group],
and/or a structural unit represented by Formula (X2):

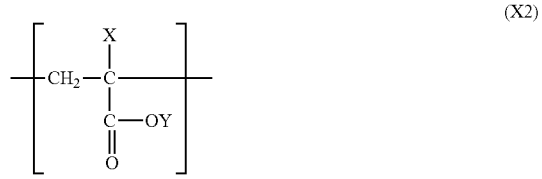

[wherein, X represents a hydrogen atom or a methyl group, and Y represents a hydrogen atom, an alkali metal atom, or an alkyl group having 1 to 5 carbon atoms].

The structural unit represented by Formula (X2) is a structural unit derived from at least one selected from the group consisting of (meth)acrylic acids, (meth)acrylic acid alkyl esters and (meth)acrylic acid metal salts, and ring-closing of the structural unit (X2) with an adjacent structural unit derived from a vinyl ester monomer yields the structural unit (X1). In cases where the modified polyvinyl alcohol contains the structural unit represented by Formula (X1) and/or the structural unit represented by Formula (X2) as the structural unit (X), when the bundled yarn is kneaded with a hydraulic material such as a cement and water, not only quick separation of the fibers is likely to be achieved and the separation degree of the fibers is likely to be improved, but also agglomeration of separated-fibers is likely to be inhibited.

The modified polyvinyl alcohol may contain one structural unit represented by Formula (X1), or may contain two or more structural units represented by Formula (X1). Further, the modified polyvinyl alcohol may contain one structural unit represented by Formula (X2), or may contain two or more structural units represented by Formula (X2). In addition to one or more structural units represented by Formula (X1) and/or one or more structural units represented by Formula (X2), the modified polyvinyl alcohol may further contain other structural unit.

When the modified polyvinyl alcohol contains the structural unit represented by Formula (X1) and/or the structural unit represented by Formula (X2), a molar amount ratio (X1/(X1+X2)) of the structural unit represented by Formula (X1) with respect to a total molar amount of the structural unit represented by Formula (X1) and the structural unit represented by Formula (X2) is preferably 0.65 to 1.0, more preferably 0.70 to 0.99, still more preferably 0.85 to 0.99, particularly preferably 0.90 to 0.99. When the content ratio of the structural unit represented by Formula (X1) is not lower than the above-described lower limit, the performance of the modified polyvinyl alcohol as a sizing agent is likely to be improved and, for example, damage to the fibers during dry-mixing of the bundled yarn with a hydraulic material is likely to be inhibited. The content (molar amount) of the structural unit (X1) and that of the structural unit (X2) in the modified polyvinyl alcohol can each be determined from a peak in 1H-NMR of the modified polyvinyl alcohol, or from the ratio of monomers added in the production of the modified polyvinyl alcohol.

In one preferred mode of the present invention, the modified polyvinyl alcohol contains at least the structural unit represented by Formula (X1). In this mode, the amount of the structural unit represented by Formula (X1) is preferably 0.1 to 10% by mole, more preferably 0.5 to 10% by mole, more preferably 1 to 9.5% by mole, particularly preferably 2 to 9% by mole, taking the amount of all monomer units of the modified polyvinyl alcohol as 100% by mole. When the amount of the structural unit represented by Formula (X1) is in this range, the performance of the modified polyvinyl alcohol as a sizing agent (e.g., adhesion of the fibers) is likely to be improved and, for example, damage to the fibers during dry-mixing of the bundled yarn with a hydraulic material is likely to be inhibited. In addition, quick and sufficient fiber-separation of the fibers is likely to be achieved at the time of mixing the bundled yarn with water. Consequently, not only the fiber-separation degree of the bundled yarn is likely to be increased and the fiber agglomeration is likely to be inhibited, but also the mechanical strength of a molded body is likely to be improved.

(Production Method of Modified Polyvinyl Alcohol)

The modified polyvinyl alcohol can be obtained by copolymerizing a vinyl ester monomer and a carbonyl group-containing monomer (an unsaturated carboxylic acid or derivative thereof) by a known method, saponifying the thus obtained copolymer by a known method, and subsequently performing a washing treatment and a heating treatment on the thus saponified copolymer. The modified polyvinyl alcohol can be efficiently obtained by further performing neutralization by an acid treatment after the saponification, followed by a washing treatment and a heating treatment.

Examples of the vinyl ester monomer used in the production of the modified polyvinyl alcohol include vinyl acetate, vinyl propionate, and vinyl formate; however, from the economic standpoint, it is preferred to use vinyl acetate. Examples of the carbonyl group-containing monomer used in the production of the modified polyvinyl alcohol include acrylic acid, methacrylic acid, and alkyl esters of these carboxylic acids. As the alkyl esters, for example, methyl ester and ethyl ester can be preferably used. Further, carboxylates obtained by partially or entirely neutralizing any of these carboxylic acids and esters can also be preferably used. A vinyl monomer containing a lactone ring in a side chain may be used as well.

In order to allow at least some of plural structural units (X) to form ring-closed structural units with hydroxy groups contained in their adjacent structural units derived from a vinyl ester monomer, it is important to perform a heat treatment. A method of the heating treatment is not particularly restricted; however, it is preferred to use, for example, a hot-air dryer or a tumble dryer. The heating temperature is preferably 60 to 150° C., more preferably 80 to 150° C. The heating time is preferably 1 to 10 hours, more preferably 2 to 8 hours. By the above-described heating treatment, for example, the ratio of the structural unit (X1) with respect to a total amount of the structural unit (X1) and the structural unit (X2) can be adjusted to be in the above-prescribed range.

(Fibers)

The fibers contained in the bundled yarn of the present invention are not particularly restricted, and examples thereof include: synthetic polymer fibers, such as polyvinyl alcohol (hereinafter, may be referred to as "PVA") fibers, polyolefin fibers, polyamide fibers (including aramid fibers), acrylic fibers, polybenzoxazole fibers, polyester fibers, and rayon fibers (e.g., polynosic fibers and solvent-spun cellulose fibers); metal fibers; and glass fibers.

PVA fibers are fibers that contain a vinyl alcohol-based polymer and, from the standpoints of the mechanical performance, the adhesion with a hydraulic material and the alkali resistance, the fibers contain a vinyl alcohol-based polymer in an amount of preferably not less than 30% by mass, more preferably not less than 60% by mass, still more preferably not less than 80% by mass. From the standpoint of improving the strength of the resulting molded body, the fibers contained in the bundled yarn of the present invention are preferably PVA fibers. When the fibers are PVA fibers, since the PVA fibers are highly hydrophilic because of their molecular structure and hydroxy groups of the fibers bind with Ca of a cement, the chemical adhesive strength between the fibers and the cement is likely to be enhanced through improvement in the affinity. In addition, this allows the peripheries of the fibers to have a calcium hydroxide-rich structure; therefore, the frictional resistance between the fibers and the cement is likely to be improved.

The vinyl alcohol-based polymer constituting the PVA fibers may be a homopolymer of vinyl alcohol or, as long as the effects of the present invention are not impaired, the vinyl alcohol-based polymer may be a copolymer of vinyl alcohol and other monomer or may be modified. From the standpoint of improving the mechanical strength, alkali resistance, hot water resistance and the like of the fibers, when the amount of all monomer units constituting the vinyl alcohol-based polymer is taken as 100% by mole, a total of the amount of a structural unit derived from a modified polyvinyl alcohol monomer, which is optionally contained, and the amount of a monomer(s) other than vinyl alcohol, which is/are optionally contained, is preferably 30% by mole or less, more preferably 10% by mole or less.

From the standpoint of improving the mechanical strength, alkali resistance and hot water resistance of the fibers, the vinyl alcohol-based polymer constituting the PVA fibers has a viscosity-average polymerization degree of preferably 1,000 or higher, more preferably 1,500 or higher. From the standpoint of reducing the production cost of the vinyl alcohol-based polymer, the viscosity-average polymerization degree is preferably 10,000 or lower, more preferably 5,000 or lower, still more preferably 3,000 or lower. A method of measuring the viscosity-average polymerization degree is as described above for the modified polyvinyl alcohol.

From the standpoint of the heat resistance, durability, and dimensional stability of the fibers, the vinyl alcohol-based polymer constituting the PVA fibers has a saponification degree of preferably 99% by mole or higher, more preferably 99.5% by mole or higher, still more preferably 99.8% by mole or higher. An upper limit of the saponification degree is 100% by mole or lower. A method of measuring the saponification degree is as described above for the modified polyvinyl alcohol.

The fibers contained in the bundled yarn of the present invention may be fibers constituted by a single kind of polymer, or may be composite fibers constituted by two or more kinds of polymers. Examples of the form of the composite fibers include those of a sea-island type, a core-sheath type, and a side-by-side type.

The fibers contained in the bundled yarn of the present invention have a fiber length of preferably 6 mm or greater, more preferably 8 mm or greater, still more preferably 10 mm or greater, but preferably 60 mm or less, more preferably 50 mm or less, still more preferably 40 mm or less. When the fiber length of the polyvinyl alcohol fibers is not greater than the above-described upper limit, entanglement of the fibers is further inhibited, so that the dispersibility of the fibers in a molded body of a hydraulic composition is further improved. In addition, since the fibers have excellent conformability to the expansion and contraction of a molded body of a hydraulic composition, the performance of reinforcing the hydraulic material is further improved. When the fiber length of the polyvinyl alcohol fibers is not less than the above-described lower limit, the adherence of the fibers to the hydraulic material is high, and the fibers have superior performance of reinforcing the hydraulic material.

The fibers contained in the bundled yarn of the present invention have an aspect ratio of preferably 50 to 2,500, more preferably 60 to 2,000, still more preferably 60 to 1,000, yet still more preferably 60 to 900, particularly preferably 70 to 800. When the aspect ratio is not lower than the above-described lower limit, the reinforcing effect by an addition of the fibers is likely to be improved. Further, when the aspect ratio is not higher than the above-described upper limit, entanglement of separated-fibers contained in a matrix containing a hydraulic material is likely to be inhibited, so that the performance of reinforcing the hydraulic material is likely to be improved. It is noted here that the term "aspect ratio" used herein means a ratio (L/D) between the fiber length (L) and the fiber diameter (D), which can be determined by measuring the fiber length in accordance with JIS L1015 "Test methods for man-made staple fibers (8.5.1)" and calculating the ratio thereof to the fiber diameter.

The fibers contained in the bundled yarn of the present invention have an average fiber diameter of preferably 3 to 900 μm, more preferably 4 to 800 μm, still more preferably 5 to 700 μm. When the average fiber diameter of the fibers is not less than the above-described lower limit, the performance of reinforcing a molded body of a hydraulic composition is likely to be improved, and the mechanical strength of the resulting molded body is thus likely to be enhanced. It is noted here that the average fiber diameter of the fibers can be determined by measuring the fiber diameter for a plurality of the fibers under a light microscope and calculating the average thereof, for example, in accordance with the method described below in the section of Examples.

The fibers contained in the bundled yarn of the present invention have a tensile strength of preferably 5 cN/dtex or higher, more preferably 8 cN/dtex or higher, still more preferably 10 cN/dtex or higher, particularly preferably 11 cN/dtex or higher. When the tensile strength of the fibers is not less than the above-described lower limit, the performance of reinforcing a molded body of a hydraulic composition is likely to be improved, and the mechanical strength of the resulting molded body is thus likely to be enhanced. An upper limit of the tensile strength of the fibers contained in the bundled yarn of the present invention is not particularly restricted; however, it is, for example, 30 cN/dtex or less. It is noted here that the tensile strength of the fibers is determined in accordance with JIS L1013.

(Other Components)

The bundled yarn of the present invention may also contain other component(s) in addition to the fibers and the sizing agent, as long as the effects of the present invention are not impaired. Examples of the other components include oil agents. The oil agents are, for example, hydrocarbon oils and silicone oils. When the bundled yarn contains such other components, the amount thereof is preferably 0.5% by mass or less, more preferably 0.3% by mass or less, with respect to a total mass of the bundled yarn.

The bundled yarn of the present invention contains at least fibers and a modified polyvinyl alcohol as a sizing agent. The content of the fibers in the bundled yarn is preferably 85 to 99.5% by mass, more preferably 88 to 99% by mass, particularly preferably 90 to 98% by mass, with respect to a total mass of the bundled yarn. When the content of the fibers is in this range, the fibers are easily dispersed in a hydraulic composition at the time of mixing, so that the strength of a molded body is likely to be further improved.

The content of the sizing agent in the bundled yarn may be preferably 0.01 to 15% by mass, more preferably 0.1 to 15% by mass, still more preferably 0.5 to 15% by mass, particularly preferably 1 to 12% by mass, particularly more preferably 1 to 10% by mass, especially preferably 2 to 10% by mass, with respect to a total mass of the bundled yarn. Further, the content of the sizing agent in the bundled yarn is preferably not less than 0.01% by mass, more preferably not less than 0.1% by mass, still more preferably not less than 0.5% by mass, yet still more preferably not less than 1% by mass, particularly preferably not less than 2% by mass, but preferably 15% by mass or less, more preferably 12% by mass or less, still more preferably 10% by mass or less, with respect to the mass of the fibers contained in the bundled yarn. The content of the sizing agent may be preferably 0.01 to 15% by mass, more preferably 0.1 to 15% by mass, still more preferably 0.5 to 15% by mass, particularly preferably 1 to 12% by mass, particularly more preferably 1 to 10% by mass, especially preferably 2 to 10% by mass, with respect to the mass of the fibers contained in the bundled yarn. When the content of the sizing agent is not less than the above-described lower limit, fiber-separation of the fibers at the time of mixing a hydraulic material and the bundled yarn in a dry state is likely to be inhibited, as a result of which damage to the fibers is likely to be prevented. Further, when the content of the sizing agent is not more than the above-described upper limit, the fiber-separation degree of the fibers at the time of kneading the bundled yarn with a hydraulic material and water is likely to be increased.

The bundled yarn of the present invention has a fiber separation degree of preferably 80% or higher, more preferably 85% or higher, still more preferably 90% or higher. An upper limit of the fiber separation degree may be any value as long as it is 100% or lower. It is noted here that the term "fiber-separation degree" used herein means a ratio of separated-fibers after 30-second kneading of the bundled yarn with a hydraulic material and water. For example, an aggregate, a cement and the bundled yarn are dry-mixed at a mass ratio of 50:50:1.5 (aggregate:cement:bundled yarn), and water is subsequently added in an amount of 0.4 times the mass of the cement contained in the resulting mixture, followed by 30-second mixing, after which, for the thus obtained paste-form mixture, the ratio of the amount of bundled yarn which is separated is calculated taking the amount of the fibers contained in the mixture as 100%, whereby the fiber-separation degree can be determined. Specifically, the fiber-separation degree may be determined by the method described below in the section of Examples. When the fiber-separation degree of the fibers after the 30-second kneading with the hydraulic material and water is not lower than the above-described lower limit, damage to the fibers is likely to be inhibited and formation of fiber balls is thus unlikely to occur, so that the mechanical strength of a molded body to be eventually obtained is likely to be improved.

The bundled yarn of the present invention has a fiber agglomeration degree of preferably 10% or lower, more preferably 8% or lower, still more preferably 5% or lower. A lower limit of the fiber agglomeration degree may be any value as long as it is 0% or higher. It is noted here that the term "fiber agglomeration degree" used herein means a ratio of the amount of fiber balls after 3-minute kneading of the bundled yarn with a hydraulic material and water. For example, an aggregate, a cement and the bundled yarn are dry-mixed at a mass ratio of 50:50:1.5 (aggregate:cement: bundled yarn), and water is subsequently added in an amount of 0.4 times the mass of the cement contained in the resulting mixture, followed by 3-minute mixing, after which, for the thus obtained paste-form mixture, the ratio of the amount of the fibers forming fiber balls is calculated taking the amount of the fibers contained in the mixture as 100%, whereby the fiber agglomeration degree can be determined. Specifically, the fiber agglomeration degree may be determined by the method described below in the section of Examples. When the agglomeration degree of the fibers after 3-minute kneading with the hydraulic material and water is not higher than the above-described upper limit, the mechanical strength of a molded body to be eventually obtained is likely to be improved.

<Production Method of Bundled Yarn>

A method of producing the fibers contained in the bundled yarn of the present invention is not particularly restricted, and ordinary melt spinning, solution spinning, dry spinning or the like can be employed. The fibers contained in the bundled yarn of the present invention can be produced by, for example, the following method. For example, when the fibers are PVA fibers, a vinyl alcohol-based polymer is prepared in the form of hydrated chips having a concentration of 40 to 60% by mass and subsequently heated and dissolved in an extruder, followed by defoaming. Then, a cross-linking agent is added to the thus obtained aqueous solution of the vinyl alcohol-based polymer. Examples of the cross-linking agent include ammonium sulfate, sulfuric acid, ammonium phosphate, phosphoric acid, hydrochloric acid, nitric acid, acetic acid, and oxalic acid; however, ammonium sulfate is preferred from the standpoint of inhibiting the corrosion of piping and the generation of offensive odor and preventing the fibers from foaming. The amount of the cross-linking agent to be added is preferably 0.5 to 10% by mass with respect to the mass of the vinyl alcohol-based polymer. The temperature of a spinning dope is preferably 90 to 140° C. Such a spinning dope to which the cross-linking agent has been added is compressed and discharged from a nozzle opening into the air to perform dry spinning. The nozzle opening may have a circular shape, or may have a different shape other than a circular shape, such as a flat shape, a cross shape, a T-shape, a Y-shape, an L-shape, a triangular shape, a square shape, or a star shape. The spinning method may be any of dry spinning, dry-wet spinning, and dry spinning.

Next, the thus spun fibers are dried. The drying temperature is usually 100° C. or lower and, once the fibers are dried to a certain extent, it is preferred to completely dry the fibers under a temperature condition of 100° C. or higher.

The drying is followed by drawing of the fibers. This drawing is performed under a drawing temperature of usually 200 to 250° C., preferably 220 to 240° C. The draw ratio is usually 5 or higher, preferably 6 or higher. The drawing is performed in a hot air-type drawing furnace over a period of about 20 seconds to 3 minutes. The fibers drawn in this manner are heat-treated as required so as to allow the fibers to have a fixed length or to contract. The thus obtained fibers may be crimped and/or coated with an oil agent as required. When the fibers are polyvinyl alcohol fibers, the cross-linking agent added to the spinning dope reacts with the OH groups of polyvinyl alcohol to form cross-links during the drawing.

Subsequently, as a sizing agent, a modified polyvinyl alcohol is applied to the thus obtained fibers. The amount of the sizing agent to be applied is preferably 0.01% by mass or greater, more preferably 0.1% by mass or greater, still more preferably 0.5% by mass or greater, yet still more preferably 1% by mass or greater, particularly preferably 2% by mass or greater, but preferably 15% by mass or less, more preferably 12% by mass or less, still more preferably 10% by mass or less, with respect to the mass of the fibers. Further, the content of the sizing agent is preferably 0.01 to 15% by mass, more preferably 0.1 to 15% by mass, still more preferably 0.5 to 15% by mass, particularly preferably 1 to 12% by mass, particularly more preferably 1 to 10% by mass, especially preferably 2 to 10% by mass, with respect to the mass of the fibers contained in the bundled yarn. An application method is not particularly restricted; however, from the standpoint of the ease of uniformly adding the sizing agent to the fibers, it is preferred to employ a method of applying a solution (preferably an aqueous solution) containing the sizing agent. In this case, the concentration of the sizing agent in the solution may be set as appropriate in accordance with, for example, the applicator to be used, the desired content of the sizing agent, and the viscosity of the solution. The step of applying the sizing agent to the fibers may be performed as any step after the spinning step. The application may be performed using a roller touch method, a drafting-pen-shaped-spout (or nozzle) or the like. When a solution containing the sizing agent is applied, its solvent (e.g., water) is removed by drying after the application, whereby the bundled yarn of the present invention is obtained. The drying conditions are not particularly restricted, and the temperature and the time may be set as appropriate such that the solvent in use is evaporated. Other component(s) such as an oil agent may also be incorporated into the solution containing the sizing agent to produce the bundled yarn of the present invention.

Thereafter, the thus obtained bundled yarn is cut at a desired fiber length. A cutting method is not particularly restricted, and examples thereof include a side cutting method, a water jet method, a laser cutting method, a disc blade cutting method, an ultrasonic cutting method, and a scissors cutting method. Thereamong, from the standpoint of inhibiting damage to the fiber ends, a side cutting method, a laser cutting method, and a water jet method are preferred.

<Hydraulic Composition and Molded Body>

A hydraulic composition can be obtained by mixing the bundled yarn of the present invention with a cement component, an aggregate, and water. By curing this hydraulic composition, a molded body such as a concrete mortar can be produced. A molded body produced using the bundled yarn of the present invention has a small number of fiber balls and exhibits a high mechanical strength; therefore, it is useful as a variety of building materials, such as wall materials and roofing materials. The present invention also provides: a hydraulic composition comprising at least the bundled yarn of the present invention, a cement component, an aggregate, and water; and a molded body obtained by curing the hydraulic composition. In the bundled yarn of the present invention, plural fibers are integrated by a sizing agent; however, in the hydraulic composition and the molded body according to the present invention which contain the bundled yarn, the bundled yarn of the present invention may be contained in a state where the plural fibers are separated. Therefore, such an expression "a hydraulic composition and a molded body contain the bundled yarn of the present invention" may represent a case in which the bundled yarn of the present invention in a state where plural fibers are integrated by a sizing agent is contained in the hydraulic composition and the molded body with the plural fibers being maintained in an integrated state by the sizing agent at least partially, or a case in which the hydraulic composition is produced using the bundled yarn in a state where plural fibers are integrated by a sizing agent, and the bundled yarn is contained in the hydraulic composition and the molded body with the sizing agent being dissolved and the plural fibers being separated.

A hydraulic material contained in the hydraulic composition is, for example, a cement component. Examples of the cement component include Portland cements, such as an ordinary Portland cement, a high early strength Portland cement, an ultra-high early strength Portland cement, and a moderate-heat Portland cement; alumina cements; blast-furnace cements; silica cements; and fly ash cements.

These cements may be used singly, or in combination of two or more thereof.

(Aggregate)

As the aggregate contained in the hydraulic composition, a variety of aggregates can be used in accordance with the need. Examples of the aggregate include fine aggregates, light-weight aggregates, and coarse aggregates. These aggregates may be used singly, or in combination of two or more thereof.

The fine aggregates may be aggregates having a particle size of 5 mm or smaller, and examples thereof include: sands having a particle size of 5 mm or smaller; and fine aggregates obtained by powderization or granulation of inorganic materials, such as silica stone, fly ash, blast-furnace slag, volcanic ash shirasu, various kinds of sludge, and rock minerals. These fine aggregates may be used singly, or in combination of two or more thereof. Examples of the sands include river sand, mountain sand, sea sand, crushed sand, silica sand, slag, glass sand, iron sand, ash sand, calcium carbonate, and artificial sand. These fine aggregates may be used singly, or in combination of two or more thereof.

The coarse aggregates are aggregates that contain not less than 85% by mass of particles having a size of 5 mm or larger. The coarse aggregates may be composed of particles having a size of larger than 5 mm. Examples of the coarse aggregates include various gravels, artificial aggregates (e.g., blast-furnace slag), and regenerated aggregates (e.g., regenerated aggregates of construction waste). These coarse aggregates may be used singly, or in combination of two or more thereof.

Examples of the light-weight aggregates include: natural light-weight aggregates, such as volcanic gravels, expanded slags, and cinders; and artificial light-weight aggregates, such as expanded pearlstone, expanded perlite, expanded obsidian, vermiculite, shirasu balloon, and fly ash microballoon. These light-weight aggregates may be used singly, or in combination of two or more thereof.

The hydraulic composition may also contain a functional aggregate in addition to the above-described aggregate. Examples of the functional aggregate include colored aggregates, hard aggregates, elastic aggregates, and aggregates having specific shapes, specifically phyllosilicates (e.g., mica, talc, and kaolin), alumina, and silica. The ratio of the functional aggregate with respect to the aggregate can be set as appropriate in accordance with the types of the respective aggregates and, for example, the mass ratio of the aggregate to the functional aggregate (aggregate/functional aggregate) may be 99/1 to 70/30, preferably 98/2 to 75/25, more preferably 97/3 to 80/20. The above-described functional aggregates may be used singly, or in combination of two or more thereof.

The mass ratio of a total amount of the aggregate (S) to the cement component (C) (aggregate (S)/cement component (C)) may be preferably 1/10 to 5/1, more preferably 1/8 to 4/1, still more preferably 1/6 to 3/1.

The amount of the bundled yarn of the present invention to be added to the hydraulic composition can be set as appropriate in accordance with the type, the fiber length, the aspect ratio and the like of the fibers contained in the bundled yarn of the present invention and, for example, when fibers of 660 μm or larger in average fiber diameter are used, the bundled yarn of the present invention may be added in such an amount that makes the amount of the fibers be preferably 1 to 70 kg/m$^3$, more preferably 2 to 40 kg/m$^3$, still more preferably 3 to 30 kg/m$^3$, based on the volume of the molded body to be eventually obtained. For example, when fibers of less than 660 μm in average fiber diameter are used, the bundled yarn of the present invention may be added in such an amount that makes the amount of the fibers be preferably 1 to 70 kg/m$^3$, more preferably 2 to 40 kg/m$^3$, still more preferably 2 to 30 kg/m$^3$, based on the volume of the molded body to be eventually obtained. When the amount of the added bundled yarn is in the above-described range, the reinforcing effect provided by the fibers is further enhanced. In addition, entanglement of the fibers due to an excessively high fiber content is likely to be inhibited, so that the reinforcing effect provided by the fibers is likely to be further improved.

The hydraulic composition may further contain various admixtures as required. Examples of the admixtures include AE agents, fluidizers, water reducing agents, high-range water reducing agents, AE water reducing agents, high-range AE water reducing agents, thickening agents, water retention agents, water repellants, expanding agents, curing accelerators, retarding agents, and polymer emulsions [acrylic emulsions, ethylene-vinyl acetate emulsions, and SBR (styrene-butadiene-rubber) emulsions].

These admixtures may be used singly, or in combination of two or more thereof. A polymer emulsion not only reduces the brittleness of the molded body to be eventually obtained but also can enhance the adhesion between the components of the molded body. In addition, by using a polymer emulsion in combination, not only the waterproof performance of the molded body can be improved but also excessive drying can be inhibited.

The hydraulic composition may further contain a water-soluble polymer substance as required. Examples of the water-soluble polymer substance include: cellulose ethers, such as methyl cellulose, hydroxymethyl cellulose, hydroxyethyl cellulose, carboxymethyl cellulose, and hydroxypropylmethyl cellulose; polyvinyl alcohols; polyacrylic acids; and lignin sulfonates. These water-soluble polymer substances may be used singly, or in combination of two or more thereof.

The number of fiber balls contained in the molded body to be eventually obtained is preferably 0 to 5, more preferably 0 or 1. When the number of fiber balls in a concrete mortar is in this range, the mechanical strength of the resulting molded body is further enhanced, and the molded body has an excellent flexural strength, compressive strength and the like. Fiber balls are formed by entanglement of the fibers due to defective mixing of the fibers and the cement component in the hydraulic composition and have a ball-like shape. The number of such fiber balls can be measured by the method described below in the section of Examples.

The slump loss of the molded body is preferably 6 cm or less, more preferably 4 cm or less, still more preferably 2 cm or less. When the slump loss is not larger than this upper limit, the workability is improved because of high miscibility between the fibers and the cement component. A lower limit value of the slump loss is not particularly restricted; however, it is usually not less than 1 cm. The slump loss can be determined by performing a slump test in accordance with JIS A1101 "Method of test for slump of concrete".

A molded body can be obtained by curing the hydraulic composition which contains the bundled yarn of the present invention, water, a cement component, an aggregate and, as required, various admixtures within a range that does not impair the effects of the present invention.

The hydraulic composition is kneaded by a kneading means, such as a known or commonly used mixer. The kneading can be carried out without any particular restriction on the kneading order of the constituent materials; however, in order to minimize a physical impact on the fibers as much as possible, the kneading order is adjusted as appropriate in accordance with the constitution of the hydraulic composition, the water/cement component ratio (W/C), and the like.

The water/cement component ratio (W/C) in the hydraulic composition is adjusted as appropriate in accordance with the constitution of the hydraulic composition and the like, and it is preferably 20 to 50% by mass, more preferably 25 to 45% by mass, still more preferably 30 to 40% by mass.

A method of supplying the bundled yarn of the present invention to the hydraulic composition is not particularly restricted. For example, a variety of quantitative supply apparatuses (e.g., a vibrating feeder, a screw feeder, and a belt feeder) can be used as an apparatus that supplies the bundled yarn while controlling the amount and/or the rate of loading the fibers.

A method of adding the bundled yarn and dispersing the fibers is not particularly restricted as long as the fibers can be dispersed in a state where the fibers do not substantially exist as fiber agglomerates. For example, in the case of using a mixer or kneader that has high stirring performance, a dual arm kneader, a pressure kneader, an Eirich mixer, a super mixer, a planetary mixer, a Banbury mixer, a continuous mixer, a continuous kneader or the like can be used as the mixer or kneader that has high stirring performance.

Subsequently, the hydraulic composition containing the fibers is added to a formwork and, as required, vibration may be applied thereto. Vibration is usually applied by vibrating the formwork. The application of vibration makes it easier to more evenly distribute the hydraulic composition inside the formwork.

The frequency of the vibration is preferably 10 to 1,000 Hz, more preferably 20 to 900 Hz, still more preferably 30 to 800 Hz. The amplitude is preferably 0.1 to 20 µm, more preferably 0.5 to 18 µm, still more preferably 1 to 15 µm.

The hydraulic composition added to the formwork may be pressed using an upper-surface mold, a roll, or the like. The pressure during the pressing can be set as appropriate in accordance with, for example, the state of the kneaded hydraulic composition and the shape of the formwork, and it is preferably 10 to 150 MPa, more preferably 20 to 140 MPa, still more preferably 30 to 130 MPa. When the pressure is 10 MPa or higher, the materials are sufficiently integrated, while when the pressure is 150 MPa or lower, the fibers are unlikely to be damaged by a pressure from the aggregate, and a reduction in the fiber strength and a reduction in the durability of the formwork can be avoided.

The pressing may be performed with heating as required. The heating temperature is preferably 40 to 90° C., more preferably 45 to 85° C., still more preferably 50 to 80° C.

After the hydraulic composition is molded into a prescribed shape, the hydraulic composition is hardened by curing in an atmosphere of 100° C. or lower, whereby a molded body can be obtained.

The use of the hydraulic composition containing the bundled yarn of the present invention is not particularly restricted, and the hydraulic composition can be used for producing a molded body for various applications. Examples of the molded body include blocks, floor panels, wall panels, partition walls, roofing materials, and roofing tiles.

EXAMPLES

The present invention will now be described in more detail by way of Examples thereof; however, the present invention is not restricted thereto.

[Measurement Methods and Evaluation Methods]

<Tensile Strength of Fibers>

The tensile strength was measured in accordance with JIS L1013.

<Average Fiber Diameter of Fibers>

As for the average fiber diameter, 100 fibers were randomly taken out, the diameter of each fiber was measured in a lengthwise central portion under a light microscope, and an average of the thus measured values was determined as the average fiber diameter.

<Aspect Ratio of Fibers>

An "aspect ratio" means a ratio (L/D) between the fiber length (L) and the fiber diameter (D). In the present invention, the average fiber length was determined in accordance with JIS L1015 "Test methods for man-made staple fibers (8.5.1)", and a ratio thereof to the average fiber diameter was calculated as the aspect ratio of fibers.

<Fiber-Separation Degree after Kneading with Hydraulic Material>

An aggregate, a Portland cement, and a bundled yarn were dry-mixed at a mass ratio of 50:50:1.5 (aggregate:Portland cement:bundled yarn) using a turbo mixer (manufactured by Pacific Machinery & Engineering Co., Ltd.). Then, water was added in an amount of 0.4 times the mass of the cement contained in the resulting mixture, and the resultant was mixed for 30 seconds using a turbo mixer (manufactured by Pacific Machinery & Engineering Co., Ltd.) to obtain a paste-form mixture. Subsequently, 20 g of the thus obtained mixture was recovered and applied onto a 40-mesh wire net at a uniform thickness and, immediately thereafter, the wire net was washed with water to remove the cement component. From the fibers remaining on the wire net, fiber-separated fibers and unseparated bundled-yarn were separately recovered using forceps and dried at 100° C. for 24 hours, after which the mass of the separated fibers ($W_a$g) and the mass of the unseparated bundled-yarn ($W_b$g) were each measured. The fiber-separation degree was calculated by the following equation.

$$\text{Fiber-separation degree [\%]}=(W_a/(W_a+W_b))\times 100$$

<Fiber Agglomeration Degree after Kneading with Hydraulic Material>

An aggregate, a Portland cement, and a bundled yarn were dry-mixed at a mass ratio of 50:50:1.5 (aggregate:Portland cement:bundled yarn) using a turbo mixer (manufactured by Pacific Machinery & Engineering Co., Ltd.). Then, water was added in an amount of 0.4 times the mass of the cement contained in the resulting mixture, and the resultant was mixed for 3 minutes using a turbo mixer (manufactured by Pacific Machinery & Engineering Co., Ltd.) to obtain a paste-form mixture. Subsequently, 100 g of the thus obtained mixture was recovered and applied onto a 40-mesh wire net at a uniform thickness and, immediately thereafter, the wire net was washed with water to remove the cement component. From the fibers remaining on the wire net, fiber-separated fibers, unseparated bundled-yarn, and fiber balls formed by agglomeration of the fibers were separately recovered using forceps and dried at 100° C. for 24 hours, after which the mass of the fiber-separated fibers ($W_a$g), the mass of the unseparated bundled-yarn ($W_b$g), and the mass of the fiber balls formed by agglomeration of the fibers ($W_c$g) were each measured. The fiber agglomeration degree was calculated by the following equation.

$$\text{Fiber agglomeration degree [\%]}=(W_c/(W_a+W_b+W_c))\times 100$$

<Number of Buckle Parts>

In 500 ml of a 20° C. 5%-by-mass aqueous hydrochloric acid solution, 50 g of a molded body was immersed to dissolve a cement contained in the molded body. Then, 20 fibers contained in the molded body were recovered using forceps. The thus recovered fibers were immersed in a 80° C. aqueous dye solution containing a blue dye for 30 minutes. When the fibers had bent parts (buckle parts), the buckle parts were dyed in blue in the above-described dying step. The thus dyed fibers were recovered and spread over a glass slide such that the fibers were prevented from overlapping with each other as much as possible, after which a cover glass was placed thereon to prepare an evaluation sample. This evaluation sample was observed at a magnification under a video microscope manufactured by Keyence Corporation, and the number of dyed parts existing in each fiber was counted. The dyed parts were counted for 20 fibers, and an average value thereof was determined as the number of buckle parts per fiber (number/fiber).

<Flexural Strength of Molded Body>

A strip-shaped test piece of 5 cm in width and 16 cm in length was cut out from a molded body. In order to control the moisture content of this test piece constant during the measurement of flexural strength, the test piece was placed in a dryer adjusted at 40° C. for 72 hours to obtain a sample for the measurement of flexural strength. The flexural strength was measured in accordance with JIS A1408 using AUTOGRAPH AG5000-B manufactured by Shimadzu Corporation at a test speed (loading head speed) of 2 mm/min and a bending span of 100 mm by a center loading method.

The following materials were used in Examples and Comparative Examples.

(Fibers)
  PVA fiber 1: a polyvinyl alcohol fiber (manufactured by Kuraray Co., Ltd., VINYLON (registered trademark)), having a tensile strength of 14 cN/dtex and an average fiber diameter of 14 μm
  PVA fiber 2: a polyvinyl alcohol fiber (manufactured by Kuraray Co., Ltd., VINYLON (registered trademark)), having a tensile strength of 12 cN/dtex and an average fiber diameter of 38 μm
  PP fiber: a polypropylene fiber having a fiber strength of 5.4 cN/dtex and an average fiber diameter of 17 μm The above-described fibers were used after being cut to have the respective aspect ratios described below in Examples and Comparative Examples.

(Sizing Agents)
  Acrylic acid-modified PVA 1: a modified polyvinyl alcohol having a viscosity-average polymerization degree of 1,500 and a saponification degree of 99.5% by mole, in which the content ratio of the structural unit (X) derived from acrylic acid is 5% by mole, the content ratio of the structural unit (X1) is 4.8% by mole, the content ratio of the structural unit (X2) is 0.2% by mole, the ratio of the structural unit (X1) with respect to a total amount of the structural units (X1) and (X2) is 0.96, and the functional groups X and Y in the structural units (X1) and (X2) are both hydrogen atoms
  Acrylic acid-modified PVA 2: a modified polyvinyl alcohol having a viscosity-average polymerization degree of 1,500 and a saponification degree of 99.5% by mole, in which the content ratio of the structural unit (X) derived from acrylic acid is 12% by mole, the content ratio of the structural unit (X1) is 11.5% by mole, the content ratio of the structural unit (X2) is 0.5% by mole, the ratio of the structural unit (X1) with respect to a total amount of the structural units (X1) and (X2) is 0.96, and the functional groups X and Y in the structural units (X1) and (X2) are both hydrogen atoms
  Maleic acid-modified PVA: a modified polyvinyl alcohol having a viscosity-average polymerization degree of 1,300 and a saponification degree of 97% by mole, in which the content ratio of the structural unit (X) derived from maleic acid is 4% by mole
  Itaconic acid-modified PVA: a modified polyvinyl alcohol having a viscosity-average polymerization degree of 620 and a saponification degree of 77% by mole, in which the content ratio of the structural unit (X) derived from itaconic acid is 1% by mole
  Unmodified PVA 1: an unmodified polyvinyl alcohol having a viscosity-average polymerization degree of 500 and a saponification degree of 88% by mole
  Unmodified PVA 2: an unmodified polyvinyl alcohol having a viscosity-average polymerization degree of 1,700 and a saponification degree of 98% by mole (Cement)
  ordinary Portland cement (manufactured by Taiheiyo Cement Corporation)

(Aggregate)
  No. 6 silica sand (manufactured by Toyo Matelan Co., Ltd.)

Example 1

A completely saponified PVA having a viscosity-average polymerization degree of 1,700 (manufactured by Kuraray Co., Ltd.) was dissolved in water at a concentration of 16.5% by mass, and boric acid was added thereto in an amount of 1.6% by mass with respect to the mass of the PVA to prepare a spinning dope. The thus obtained spinning dope was wet-spun in a 70° C. coagulation bath containing 11 g/L of sodium hydroxide and 350 g/L of sodium sulfate, and the resulting spun fibers were roller-drawn, neutralized, wet-heat drawn, washed with water, and dried in accordance with a conventional method, after which the fibers were dry-heat drawn at 235° C. to a total draw ratio of 19 in the heat treatment step of the same fiber production process, and subsequently taken up. As a result, PVA fibers 1 having an average fiber diameter of 14 μm and a tensile strength of 14 cN/dtex were obtained. To the thus obtained PVA fibers 1, an aqueous solution containing the above-described acrylic acid-modified PVA in an amount of 80 g/L was added in an amount of 5.5% by mass with respect to the mass of the PVA fibers 1 using a touch roller, and the resultant was subsequently dried to adhere the acrylic acid-modified PVA 1 to the PVA fibers 1. Thereafter, these fibers were cut to obtain a bundled yarn 1 having an aspect ratio of 429.

Example 2

A bundled yarn 2 was obtained in the same manner as in Example 1, except that the PVA fibers 2 were used in place of the PVA fibers 1, and the amount of the acrylic acid-modified PVA 1 adhered to the PVA fibers 2 was changed as shown in Table 1.

Example 3

A polypropylene ("Y2000GV" manufactured by Prime Polymer Co., Ltd.) was loaded to an extruder of a melt spinning apparatus, melt-kneaded, and then discharged from a spinneret to produce undrawn fibers at a rate of 800 m/min. Subsequently, the undrawn fibers were introduced to a hot air furnace having a temperature of 128° C. and drawn at a draw ratio of 4.6 to obtain PP fibers having an average fiber diameter of 17 μm and a fiber strength of 5.4 cN/dtex. A sizing agent was adhered to the thus obtained PP fibers in the same manner as in Example 1. Thereafter, these fibers were cut to obtain a bundled yarn 3 having an aspect ratio of 353.

Example 4

A bundled yarn 4 was obtained in the same manner as in Example 1, except that the maleic acid-modified PVA was used as a sizing agent in place of the acrylic acid-modified PVA 1.

Example 5

A bundled yarn 5 was obtained in the same manner as in Example 1, except that the amount of the acrylic acid-modified PVA 1 adhered to the PVA fibers 1 was changed as shown in Table 1.

Comparative Example 1

A bundled yarn 6 was obtained in the same manner as in Example 1, except that the unmodified PVA 1 was used as a sizing agent in place of the acrylic acid-modified PVA 1.

Comparative Example 2

A bundled yarn 7 was obtained in the same manner as in Example 1, except that the PVA fibers 2 were used in place of the PVA fibers 1, and the unmodified PVA 1 was used as a sizing agent in place of the acrylic acid-modified PVA 1.

Comparative Example 3

A bundled yarn 8 was obtained in the same manner as in Example 1, except that the PVA fibers 2 were used in place of the PVA fibers 1, the unmodified PVA 1 was used as a sizing agent in place of the acrylic acid-modified PVA 1, and the amount of the unmodified PVA 1 adhered to the PVA fibers 2 was changed as shown in Table 1.

Comparative Example 4

A bundled yarn 9 was obtained in the same manner as in Example 1, except that the unmodified PVA 2 was used as a sizing agent in place of the acrylic acid-modified PVA 1.

Comparative Example 5

A bundled yarn 10 was obtained in the same manner as in Example 1, except that the itaconic acid-modified PVA was used as a sizing agent in place of the acrylic acid-modified PVA 1.

Comparative Example 6

A bundled yarn 11 was obtained in the same manner as in Example 1, except that the acrylic acid-modified PVA 2 having a higher content ratio of the structural unit (X) derived from acrylic acid than the acrylic acid-modified PVA 1 was used as a sizing agent in place of the acrylic acid-modified PVA 1.

(Kneading Step)

For each of the thus obtained bundled yarns 1 to 11, a kneaded product was prepared in accordance with the following method.

Each bundled yarn, No. 6 silica sand, and ordinary Portland cement were loaded to a turbo mixer (manufactured by Pacific Machinery & Engineering Co., Ltd.) at a mass ratio of 1.5:50:50 (bundled yarn:No. 6 silica sand:ordinary Portland cement), and mixed for 6 minutes in a dry state under a condition of 500 revolutions/min. Subsequently, water was added to adjust the mass ratio of water/ordinary Portland cement to be 0.4, and the resultant was kneaded for 2 minutes using the above-described oscillating rotary stirrer under a condition of 400 revolutions/min, whereby kneaded products 1 to 11 were each obtained.

(Molding Step)

For each of the thus obtained kneaded products 1 to 11, a molded body was obtained in accordance with the following method.

The kneaded products obtained by the above-described kneading step were each filled into a formwork of 50 cm in width and a length of 180 cm, aiming at a thickness of 10 mm. The kneaded product filled into the formwork was pressed using a vibration press machine with a pressure of 40 MPa while applying vibration at a frequency of 200 Hz and an amplitude of 1 µm. Subsequently, for primary curing, the kneaded product was maintained for 24 hours in an environment having a temperature of 50° C. and a humidity of 98%. Thereafter, for secondary curing, the resulting primary-cured molded body was wrapped with a wet fabric and cured for 28 days in an environment having a temperature of 20° C. and a humidity of 60%, whereby molded bodies 1 to 11 were each obtained.

For the bundled yarns 1 to 11 obtained in the above-described Examples and Comparative Examples, the fiber-separation degree and the fiber agglomeration degree after kneading with a hydraulic material were measured in accordance with the above-described respective measurement methods. In addition, for the molded bodies obtained by the above-described method, the number of buckle parts and the flexural strength of each molded body were measured in accordance with the above-described respective measurement methods. The thus obtained results are shown in Table 1.

TABLE 1

| | | | Bundled yarn | | | | | | | |
|---|---|---|---|---|---|---|---|---|---|---|
| | | | Sizing agent | | | | Amount of | | Number | |
| | | Fiber | Type | Viscosity-average polymerization degree | Saponification degree (% by mole) | Amount of structural unit (X) (% by mole) | adhered sizing agent (% by mass) | Fiber separation degree (%) | Fiber agglomeration degree (%) | of buckle parts (number/fiber) | Flexural strength (N/mm$^2$) |
| Example 1 | PVA fiber 1 | acrylic acid | 1,500 | 99.5 | 5 | 5.5 | 91 | 3 | 0.3 | 17 |
| 2 | PVA fiber 2 | acrylic acid | 1,500 | 99.5 | 5 | 9.5 | 98 | 1 | 0.2 | 14 |
| 3 | PP fiber | acrylic acid | 1,500 | 99.5 | 5 | 5.5 | 91 | 2 | 0 | 10 |
| 4 | PVA fiber 1 | maleic acid | 1,300 | 97 | 4 | 5.5 | 80 | 5 | 0.7 | 10 |

TABLE 1-continued

| | | Fiber | Sizing agent Type | Viscosity-average polymerization degree | Saponification degree (% by mole) | Amount of structural unit (X) (% by mole) | Amount of adhered sizing agent (% by mass) | Fiber separation degree (%) | Fiber agglomeration degree (%) | Number of buckle parts (number/fiber) | Flexural strength (N/mm²) |
|---|---|---|---|---|---|---|---|---|---|---|---|
| | 5 | PVA fiber 1 | acrylic acid | 1,500 | 99.5 | 5 | 0.5 | 97 | 10 | 0.6 | 10 |
| Comparative Example | 1 | PVA fiber 1 | — | 500 | 88 | — | 5.5 | 30 | 3 | 0.3 | 8 |
| | 2 | PVA fiber 2 | — | 500 | 88 | — | 5.5 | 35 | 15 | 1.8 | 7 |
| | 3 | PVA fiber 2 | — | 500 | 88 | — | 0.5 | 70 | 30 | 2.6 | 5 |
| | 4 | PVA fiber 1 | — | 1,700 | 98 | — | 5.5 | 50 | 15 | 1.8 | 6 |
| | 5 | PVA fiber 1 | itaconic acid | 620 | 77 | 1 | 5.5 | 70 | 20 | 1.4 | 6 |
| | 6 | PVA fiber 1 | acrylic acid | 1,500 | 99.5 | 12 | 5.5 | 70 | 30 | 2.0 | 5 |

As apparent from Table 1, the bundled yarns according the present invention had a high fiber-separation degree and had a low fiber agglomeration degree when kneaded with a hydraulic material such as a cement. In addition, the bundled yarns according to the present invention had a small number of fiber buckle parts in the respective molded bodies, and exhibited an excellent effect of reinforcing a cured product of the hydraulic composition. Therefore, the bundled yarn of the present invention was confirmed to be suitable as a bundled yarn for reinforcement that is added to a hydraulic material. Particularly, in Examples 1 to 3 and 5 where a modified polyvinyl alcohol containing specific amounts of the structural unit (X1) and the structural unit (X2) was used, since the modified polyvinyl alcohol had high fiber bundling performance as a sizing agent because of the structural unit (X1), the fibers were unlikely to be disentangled during the dry-mixing of each bundled yarn and a hydraulic material, and the generation of buckle parts in the fibers during the dry-mixing was inhibited, as a result of which agglomeration of the fibers was likely to be inhibited when each bundled yarn was mixed in a hydraulic composition. In addition, in a water-added alkaline solution, since the structural unit (X1) was ring-opened and partially converted into the structural unit (X2) having a higher solubility in water, the fibers were quickly separated and the fiber-separation degree of the fibers was thus increased. Consequently, the molded bodies had an improved flexural strength. On the other hand, in those cases where an unmodified polyvinyl alcohol was used as a sizing agent as in Comparative Examples 1, 2 and 4, the fibers had a low fiber-separation degree when kneaded in a hydraulic composition, and the flexural strength of each molded body was insufficient. Particularly, in Comparative Example 2 where fibers having a large average fiber diameter were used, as compared Comparative Example 1 where fibers having a small average fiber diameter were used, the fibers were more likely to be disentangled during the dry-mixing of the bundled yarn with a hydraulic material and, therefore, buckle parts were more likely to be generated in the fibers during the dry-mixing, as a result of which the fiber agglomeration degree was higher.

Moreover, in the case of a bundled yarn in which an unmodified polyvinyl alcohol is used in a small amount as a sizing agent as in Comparative Example 3, the bundled yarn contains a large amount of fibers in an exposed state due to the small amount of the sizing agent. It is believed that such fibers are easily damaged during dry-mixing of the bundled yarn with a hydraulic material and are thus likely to generate buckle parts. As a result, at the time of the subsequent kneading in a hydraulic composition, although the fiber-separation degree was somewhat high because of the small amount of the sizing agent required to be dissolved, fiber balls were likely to be formed due to the fibers having a large number of buckle parts, and this is believed to have resulted in an extremely high fiber agglomeration degree. Consequently, the flexural strength of the molded body was also insufficient in Comparative Example 3. When the itaconic acid-modified PVA having a low saponification degree or the acrylic acid-modified PVA 2 having a high content ratio of the structural unit (X) derived from an unsaturated carboxylic acid is used as a sizing agent as in the cases of Comparative Examples 5 and 6, it is believed that the performance of the sizing agent is reduced due to a high solubility of the sizing agent in water. Such fibers are easily damaged during dry-mixing of a bundled yarn thereof with a hydraulic material, and are thus likely to generate buckle parts. In the subsequent kneading in a hydraulic composition, fiber balls are likely to be formed due to the fibers having a large number of buckle parts, and this is believed to have resulted in an extremely high fiber agglomeration degree as in Comparative Example 4.

INDUSTRIAL APPLICABILITY

The bundled yarn according to the present invention has a high fiber-separation degree and exhibits a less fiber agglomeration when kneaded into a hydraulic material such as a cement; therefore, the bundled yarn according to the present invention has an excellent effect of reinforcing a molded body of a hydraulic material, and can be preferably utilized as a bundled yarn for reinforcement that is added to a hydraulic composition.

The invention claimed is:
1. A bundled yarn, comprising:
plural fibers integrated by a sizing agent,
wherein the sizing agent is a modified polyvinyl alcohol comprising a plurality of a structural unit (X) comprising a carboxylate unit, derived from an unsaturated carboxylic acid or derivative thereof in polymerized form, in range of from 2 to 9 mol. %, taking an amount of all monomer units as 100 mol. %,
wherein the structural unit (X) comprises a structural unit of formula (X1) and (X2):

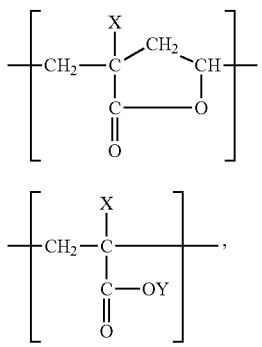

(X1)

(X2)

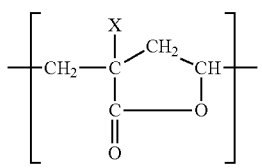

X being H or a methyl group and Y being H, an alkali metal atom, or an alkyl group having 1 to 5 carbon atoms, wherein an X1/(X1+X2) molar amount ratio is in a range of from 0.90 to 0.99, wherein the modified polyvinyl alcohol has a saponification degree of 85 mol. % or higher, and wherein the bundled yarn has a fiber separation degree of 90% or higher.

2. The bundled yarn of claim 1, wherein the modified polyvinyl alcohol has a viscosity-average polymerization degree in a range of from 100 to 5,000.

3. The bundled yarn of claim 1, wherein the saponification degree of the modified poly vinyl alcohol is in a range of from 88 to 100 mol. %.

4. The bundled yarn of claim 1, wherein the unsaturated carboxylic acid or derivative thereof comprises a (meth)acrylic acid, a (meth)acrylic acid alkyl ester, a (meth)acrylic acid metal salt, or a mixture of two or more of any of these.

5. The bundled yarn of claim 1, wherein, in formula (X1) and/or (X2)

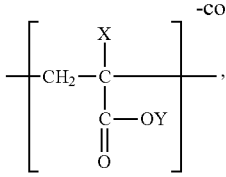

X is a methyl group.

6. The bundled yarn of claim 1, wherein the plural fibers are poly vinyl alcohol fibers.

7. The bundled yarn of claim 1, wherein the plural fibers have an average fiber diameter in a range of from 3 to 900 μm.

8. The bundled yarn of claim 1, wherein the plural fibers have an aspect ratio in a range of from 50 to 2,500.

9. The bundled yarn of claim 1, having a fiber agglomeration degree of 10% or lower.

10. The bundled yarn of claim 1, wherein the saponification degree of the modified polyvinyl alcohol is in a range of from 90 to 99.9 mol. %.

11. The bundled yarn of claim 1, wherein the saponification degree of the modified polyvinyl alcohol is in a range of from 95 to 99.8 mol. %.

12. The bundled yarn of claim 1, wherein the modified polyvinyl alcohol has a viscosity-average polymerization degree in a range of from 100 to 4,000.

13. The bundled yarn of claim 1, wherein the modified polyvinyl alcohol has a viscosity-average polymerization degree in a range of from 300 to 3,500.

14. The bundled yarn of claim 1, wherein, in formula (X1) and (X2), X is H.

15. The bundled yarn of claim 1, wherein, in formula (X1) and (X2), X is a methyl group.

16. The bundled yarn of claim 1, wherein, in formula (X1) and/or (X2), Y is an alkyl group having 1 to 5 carbon atoms.

17. The bundled yarn of claim 1, wherein, in formula (X1) and/or (X2), Y is H.

18. The bundled yarn of claim 1, wherein, in formula (X1) and/or (X2), Y is an alkali metal atom.

19. A hydraulic composition, comprising:
the bundled yarn of claim 1;
a cement component;
an aggregate; and
water.

20. A molded body, obtained by curing the hydraulic composition of claim 19.

* * * * *